INVENTOR.
GEORGE EUWEMA

ATTORNEY

_United States Patent Office_

3,550,393
Patented Dec. 29, 1970

3,550,393
LIQUID COOLING APPARATUS
George Euwema, 611 W. Evanston Circle,
Fort Lauderdale, Fla. 33313
Filed Jan. 14, 1969, Ser. No. 791,048
Int. Cl. B67d 5/62
U.S. Cl. 62—394                3 Claims

ABSTRACT OF THE DISCLOSURE

A cooling apparatus including a central tank for cooling a quantity of carbonated liquid, a refrigeration chamber surrounding said central tank, and a precooling tank surrounding the said refrigeration chamber. The refrigeration chamber is tapered with the greatest width at the top of the chamber and the smallest width at the bottom of the chamber. The refrigeration chamber cools the liquids in the central tank and the precooling tank. The liquids solidify on the outside of the walls of the refrigeration chamber to provide relatively even cooling of the tank liquids over the entire outer surface of the solidified liquids. Also the solidified liquids provide more effective cooling of the liquids in the tanks during peak load conditions.

BACKGROUND OF THE INVENTION

This invention relates to a new and improved cooling apparatus with a refrigeration chamber having tapered sides, and, more particularly, to a cooling apparatus with a central tank, a precooling tank surrounding the central tank, and a refrigeration chamber between the central tank and the precooling tank, with said refrigeration chamber tapering downwardly to provide for more effective cooling of the liquids in the tanks during peak load conditions.

As is perhaps well-known, cooling apparatus have been designed to use a relatively small refrigeration means that builds up an icing condition in the liquid storage tank during minimum load conditions to provide for maximum cooling of the liquid during peak loads. But the icing condition generally insulates the liquid from the refrigerant, reducing the overall efficiency of the device. Also, the uneven icing condition in the liquid storage tanks changes the designed liquid flow pattern in the tank, thereby further reducing the efficiency of the device.

SUMMARY OF THE INVENTION

The cooling apparatus includes a central tank, a refrigeration chamber surrounding the central tank, and a pre-cooling tank surrounding the refrigeration chamber. The central tank and refrigeration chamber share a common wall and the precooling tank and the refrigeration chamber share a common wall. The refrigeration chamber tapers from the top toward the bottom with at least one slanting wall. The liquids in the tanks adjacent the refrigeration chamber solidify on the common walls during average load conditions. The precooling tank includes a plurality of vanes connected to the outer wall of the pre-cooling tank. The vanes regulate the direction of flow or path of the liquid through the precooling tank. The vanes are spaced from the inner wall of the precooling tank. The vanes are connected to the inner wall by the solidified liquid in the precooling tank. The solidified liquids in both tanks provide relatively even cooling of the tank liquids and more effective cooling of the tank liquids during peak load conditions.

It is an object of this invention to provide a cooling chamber that is more efficient during peak load conditions.

It is another object of this invention to provide a non-complex cooling chamber.

It is another object of this invention to provide a cooling chamber that uses a relatively small refrigerating means to provide relatively large quantites of cooled liquid during peak load conditions.

It is another object of this invention to provide relatively even cooling of liquids in a tank over the entire surface of solidified liquid adjacent the refrigeration chamber.

It is another object of this invention to provide a refrigeration chamber with controlled icing in an adjacent storage tank.

It is a further object of this invention to provide a central tank, a surrounding tapered refrigeration chamber, and a precooling tank surrounding the refrigeration chamber.

An additional object of this invention is to connect vanes to one side of a tank to direct the flow of the liquid in the tank and to seal the vanes to the other side of the tank by utilizing solidified liquid as the connecting means.

In accordance with these and other objects which will be apparent hereinafter, the instant invention will now be described with particular reference to the accompanying drawing.

DESCRIPTION OF THE PREFERRED EMBODIMENT

Figure 1:
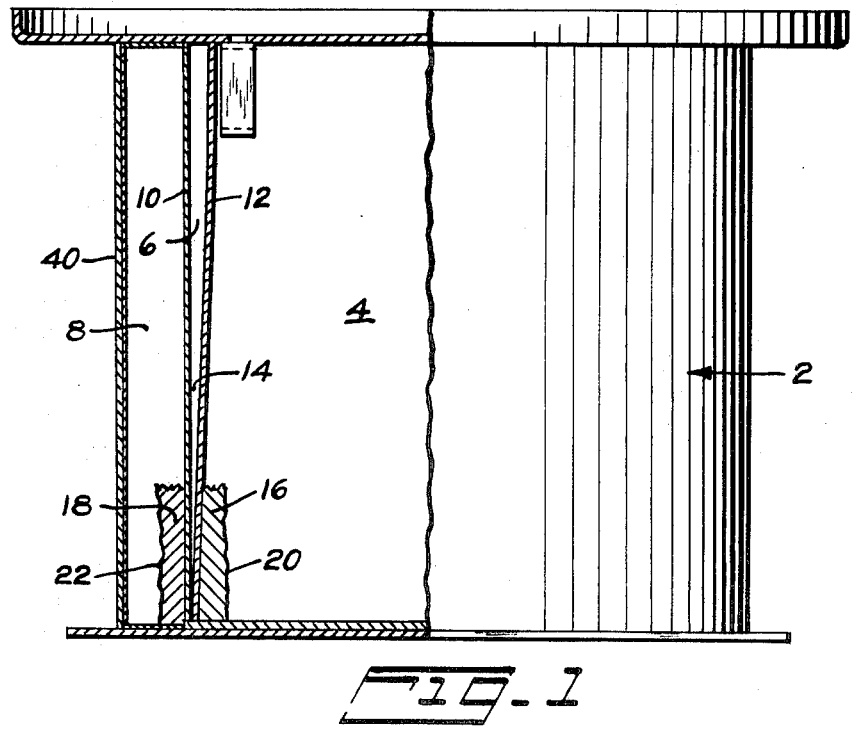
FIG. 1, is a side view, partially in cross section, of the cooling apparatus.

Referring now in detail to the drawing, wherein an embodiment of the invention is shown, and referring particularly to FIG. 1, the cooling apparatus, generally designated as numeral 2, includes a cooling tank 4, a refrigeration chamber 6 surrounding the cooling tank, and a precooling tank 8 surrounding the refrigeration chamber 6. The refrigeration chamber 6 lies between the cooling tank 4 and the precooling tank 8. Refrigeration chamber 6 tapers from the top of the chamber to the bottom of the chamber. The upper end of the refrigeration tank 6 has a greater width between the slanting inner wall and the vertical outer wall than between the lower portion of the walls. The inside, slanting side 12, of the refrigeration tank is also the outer wall of the cooling tank 4. The outside vertical wall of the refrigeration tank is also the inner wall of the precooling tank 10.

The liquid refrigerant is dispensed into the refrigeration chamber 6 to a level shown generally by numeral 14. The liquid gathers heat and is converted into a gaseous form of larger volume. The gas continues to gather heat and expand to a larger volume. The warmer gas rises as it expands in volume. The refrigeration chamber 6 is designed to accommodate the expanding volume of the refrigerant. The shape of the refrigeration chamber also aids in upward flow of the refrigerant. The design provides relatively even cooling of the liquids in the tanks. The liquids adjacent the walls 10 and 12 of the refrigeration chamber solidify to form ice walls 16 and 18. Ice wall 16 is in the cooling tank. Ice wall 18 is in the precooling tank 8. The inner surface 20 of ice wall 16 and outer surface 22 of ice wall 18 are generally parallel in relation to one another. The designed icing condition provides relatively even cooling during iced conditions. The design also allows the liquid to flow normally within the tanks.

Figure 2:
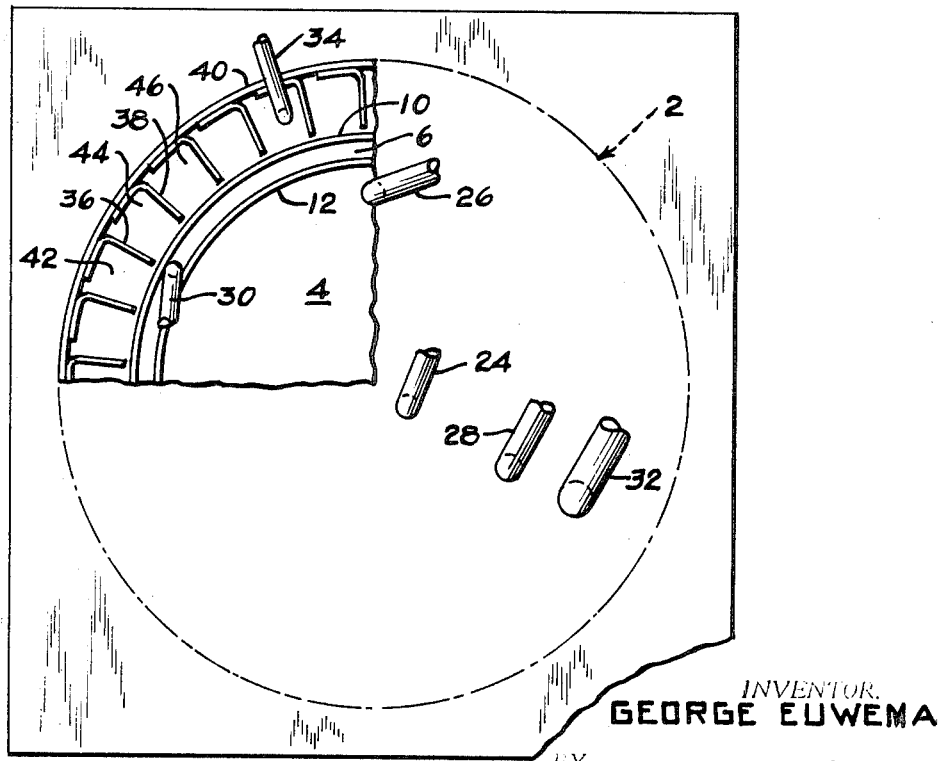
FIG. 2, is a plan view, partially in cross section, of the cooling apparatus.

Referring now to FIG. 2, wherein, an input tube 24 and output tube 26 are connected to the cooling tank 4. The input tube 28 and output tube 30 are connected to the refrigeration chamber 6. The input to the precooling tank is shown at 32 with the exiting tube shown at 34. The precooling tank 8 includes vanes 36 and 38 for controlling the path of the fluid flowing through the tank. The vanes are connected to the outer wall of the precooling tank 40. The arms of the vanes are not connected to the outer wall 10 of the refrigeration chamber. The vanes are connected to wall 10 by the liquid that solidifies on wall 10. When ice forms on the wall as shown at 18 in FIG. 1, the ice connects the vanes to the wall 10 of the refrigeration chamber and seals the opening between the vane and the wall 10. The vanes force the fluid to be driven up and down as the fluid passes around the refrigeration chamber. For example, vane 36 allows fluid to pass from the area illustrated as 42, to the area illustrated as 44, by passing over the vane 36. The fluid continues from area 44 to the area illustrated as 46, by passing under vane 38. The fluid winds its way up and down and around the refrigeration chamber.

In use the tapered refrigeration chamber allows the liquid in the central tank and the precooling tank to solidify on the walls of the refrigeration chamber. This design provides relatively even cooling over the entire walls of the refrigeration tank, even with the solidified liquid connected to the walls. The distribution of the solidified liquids establishes means for providing great quantities of cooled liquid at peak load demands with relatively small refrigeration means.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What is claimed is:
1. A cooling liquid apparatus comprising,
a cooling tank including a slanting wall, a refrigerating means producing a liquid refrigerant,
a refrigeration chamber including the cooling tank slanting wall and as a common wall, a second wall, input means for dispensing said liquid refrigerant into said refrigeration chamber, and an output means removing the gaseous refrigerant after the liquid refrigerant is converted to a gaseous refrigerant by removing heat from said cooling tank, said refrigerant chamber tapers downwardly and widens in the direction of the flow of the expanding refrigerant placed in the refrigeration chamber, whereby a portion of the cooling tank liquid adjacent the common slanting wall solidifies and provides relatively even cooling over the outer surface of the solidified liquid, and
a precooling tank connected to said refrigeration chamber to provide relatively even cooling over the outer surface of the solidified precooling liquid, said precooling tank includes said second wall of the refrigeration chamber as a common wall, an additional wall, a plurality of vanes for directing the flow of the precooling liquid in a prescribed path back and forth over the second wall and around the opposite end of each adjacent vane, said vanes are connected to said additional wall and spaced from said second wall, whereby said additional wall is connected to said second wall by the solidified precooling liquid.
2. A cooling apparatus as set forth in claim 1 wherein, said refrigeration chamber surrounds said cooling tank.
3. A cooling apparatus as set forth in claim 2 wherein, said precooling tank surrounds said cooling tank.

References Cited
UNITED STATES PATENTS

| | | | |
|---|---|---|---|
| 1,307,393 | 6/1919 | Dyer | 165—154 |
| 2,058,871 | 10/1936 | Heath | 165—147X |
| 2,183,509 | 12/1939 | Smith | 165—147X |
| 2,526,526 | 10/1950 | Yuza | 62—394X |
| 2,661,934 | 12/1953 | Stutz | 62—515X |

ALBERT W. DAVIS, JR., Primary Examiner

U.S. Cl. X.R.

62—396, 430, 440, 527; 165—141, 147, 154